May 20, 1941.  H. C. RENTSCHLER ET AL  2,242,483
RADIANT ENERGY METER AND METHOD OF MAKING
Filed June 17, 1939   2 Sheets-Sheet 2

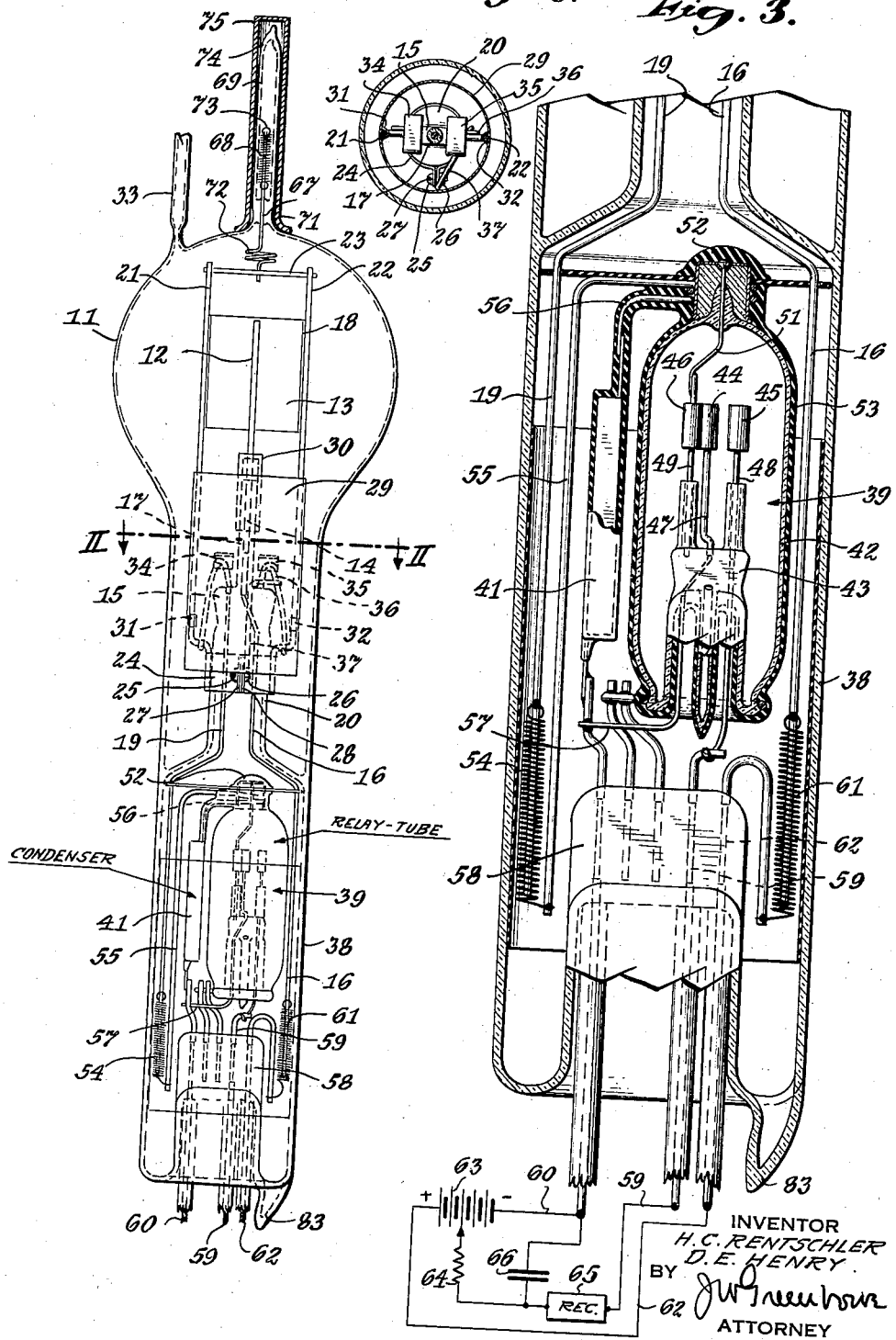

INVENTOR
H. C. RENTSCHLER
D. E. HENRY.
BY
ATTORNEY

Patented May 20, 1941

2,242,483

UNITED STATES PATENT OFFICE 2,242,483

RADIANT ENERGY METER AND METHOD OF MAKING

Harvey C. Rentschler, East Orange, and Donald E. Henry, Cedar Grove, N. J., assignors to Westinghouse Electric & Manufacturing Company, East Pittsburgh, Pa., a corporation of Pennsylvania Application June 17, 1939, Serial No. 279,662

16 Claims. (Cl. 250—172)

This invention relates to a meter for measuring radiant energy and, more particularly, to one which is especially adapted for measuring the total quantity of ultra-violet radiations received thereby.

The principal object of our invention, generally considered, is the avoidance of leakage in and over the surface of the condenser and relay tube employed with a photoelectric tube and the connections between these in the measurement of radiant energy.

Another object of our invention is the production of a combined photoelectric tube, relay tube, and condenser, with all the parts enclosed in an envelope to protect them from moisture, in order to avoid leakage in and over the surface of said parts, and to improve the accuracy in the measurement of radiations.

A further object of our invention is the production of an improved photoelectric tube and associated parts, whereby greater accuracy in the measurement of radiations is obtainable.

A still further object of our invention is an improved method of manufacturing photoelectric tubes.

An additional object of our invention is the production of apparatus for measuring radiations with greater accuracy than was heretofore obtainable.

Other objects and advantages of the invention, relating to the particular arrangement and construction of the various parts, will become apparent as the description proceeds.

Referring to the drawings:

Figure 1 is an elevational view of a photoelectric tube embodying our invention.

Figure 2 is a transverse sectional view on the line II—II of Figure 1, in the direction of the arrows.

Figure 3 is a vertical sectional view of the lower or neck portion of the tube shown in Figure 1.

Figure 5:
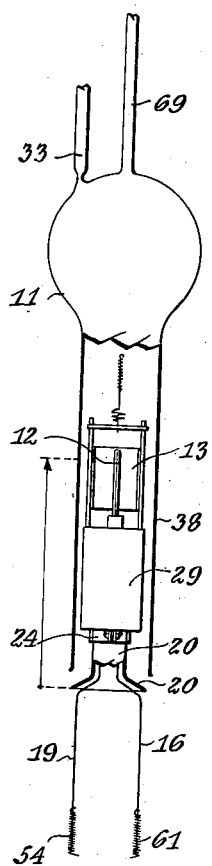
Figure 5 is a view showing the position of the parts at an early stage in the assembly of the tube of Figures 1, 2 and 3.

One of the most serious troubles with radiant energy meters, such as described and claimed in the Rentschler Patent No. 2,037,925 of April 21, 1936, owned by the assignee of the present application, has been the leakage in and over the surface of the relay tube and the condenser used in the input circuit. To obviate this trouble, we have provided a photoelectric tube, the envelope of which encloses said relay tube and condenser to keep moisture and air therefrom.

The leads from the photoelectric tube proper project into a hollow neck of the bulb or tube through a partition beneath, or separating the bulb from said neck. In the neck portion below or beyond the partition are placed the condenser and relay tube which have been carefully treated for leakage. This neck portion, forming a lower or outer compartment, is then exhausted and sealed off so that moisture from the air cannot cause trouble.

Now referring to the drawings in detail, like parts being designated by like reference characters, and first considering the photoelectric tube shown in Figures 1, 2 and 3, there is provided an envelope 11, desirably composed of a material such as Corning #972 high transmission glass, if the tube is to measure ultra-violet radiations. If the tube is to measure other than ultra-violet radiations, it is, of course, formed of a material pervious to the type of radiations to be measured. Other material suitable for the transmission of ultra-violet radiations are quartz and Corex glass, but for measuring the radiations in the bactericidal range, Corning #972 glass is particularly appropriate, and the tube of the present embodiment is especially adapted for that purpose.

Within the main, bulbous or enlarged, portion of the envelope 11 is mounted a rod-shaped anode 12 and a cathode 13. The anode 12 may be composed of titanium, if the tube is to be used like that of the Rentschler Patent No. 1,955,608 of April 17, 1934, owned by the assignee of the present application, for the measurement of ultra-violet radiations between about 2500 and 3100 A. U.

If the tube, which we will now specifically consider, is to be used for the measurement of bactericidal ultra-violet radiations or those having wave lengths of 3000 A. U. and shorter, then we preferably employ tantalum as the photosensitive material. The photosensitive material is, therefore, subject to change in accordance with the type of radiations to be measured. Thus, the anode may be formed of zirconium, vanadium, tungsten, uranium, platinum or other photoelectric material, if it is to be used for measuring radiations of other wavelengths. The anode 12 is mounted upon a lead-in conductor 14 extending through the press 15 to an external conductor 16. The conductor 14 is desirably enclosed in a dielectric shield member 17, constructed of glass or similar material. The upper portion of said shield member 17 and the joint between the anode 12 and the lead-in conductor 14, is also desirably enclosed in a shield member 30, desirably formed of lavite or similar insulating material, fitting the member 17 and having an aperture in its upper end, through which the anode 12 extends, which restricts the active area of the anode 12 to the end portion. Thus, the exposed end only of the anode need be formed of tantalum or other photoelectric material selected.

The active cathode portion 13 preferably comprises a film of tantalum, but may comprise a film of some other photoelectric material, if desired. Such a film is desirably deposited upon an electrical conductor, preferably formed of a sheet of nickel 18, which is electrically connected to leading-in conductor 19 passing through the press 15 as illustrated.

A framework, consisting of two parallel longitudinally extending wires 21 and 22, and a bracing cross-wire 23, is mounted above the press 15 by means of a carrying collar 24 frictionally engaging the flare tube 20, on which the press 15 is formed, as by being clamped thereon by a bolt 25 and nut 26, the former of which passes through overlapping flanges 27 and 28 on said collar.

Supported on this framework, is the semi-cylindrical nickel sheet 18 carrying the cathode surface 13. Slidable on the wires 21 and 22 is a cylindrical shield 29 adapted to enclose the anode 12, and said nickel sheet 18. The wires 21 and 22 desirably pass through straps or eyelets 31 and 32 in said cylindrical shield, in order to guide the same in its sliding movement therealong. By inverting the envelope 11, the shield 29 may be moved from one end of the frame to the other, that is, from the lower or illustrated position where it surrounds the press 15, to its uppermost position where it surrounds the cathode 13 and enclosed anode 12.

The function of the shield 29 is to protect the walls of the envelope from vaporized or sputtered tantalum, or other cathode-activating material, during the electrical sputtering from the anode to form said cathode.

In order to obtain the photosensitive cathode, the electrode assembly is sealed to the envelope and the whole desirably inverted, baked out and exhausted, in the usual manner heretofore employed to obtain high vacua, and the shield 29 is degasified by heat, provided by high frequency induction, for example. A filling of a gaseous medium, such as argon, neon or helium is then introduced into the envelope in any convenient manner, as through the exhaust tube 33. Argon gas at a pressure of from about 1 to 6 mm. is preferably employed, and the envelope then sealed off.

With the tube inverted and the shield 29 about the electrodes 12 and 13, a glow discharge of sufficient current density to effect positive ion bombardment of the electrode 12, is created from the electrode 13, and a sputtering or electrical vaporization of the material or tantalum of the electrode 12 to the sheet 18 of nickel, occurs, until a uniform cathode surface having the proper spectral sensitivity is formed.

A direct current discharge is employed and the rod 12 serves as a cathode, while the sheet 18 of nickel serves as the anode for said discharge. The glow discharge should be continued until a sufficient deposit of tantalum or other photosensitive material, is obtained upon the surface of the sheet of nickel 18, to render the same photoelectrically sensitive. We find it preferable to continue the discharge for about twenty hours, the exact length of time, however, depending upon conditions. The sputtered material, other than that deposited upon the sheet of nickel 18, mainly collects on the interior of the shield 29, and the shields 34 and 35, the former of which is carried by lead-in conductor 19 and the latter by spud 36 extending from the press 15, in order to maintain clear areas around where cathode-connected wires enter the press and thereby prevent short circuiting between the anode 12 and cathode 13 of said tube. Some sputtered material may escape from the open ends of the shield 29, but it would tend to fall on areas not needed for transmitting the radiations to be measured.

After the cathode 13 has been thus formed, the shield 29 is moved back to the position illustrated in Figure 1, where it is desirably maintained, except when shaken back to the top of the tube, by means of spring wire 37 which extends from a support held by the press 15, such as the spud 36, outwardly into engagement with the inner surface of said shield 29, when the latter is in the lowermost position illustrated. The main portion of the envelope 11 may then be finally exhausted, without opening to the atmosphere, by a method formerly used. If argon was used as the gas filling, said main portion desirably had apparatus connected to it, like the tube 20 of our copending application, Serial No. 102,641, filed Sept. 26, 1936, now Patent No. 2,167,777, dated August 1, 1939, and could be finally exhausted by means of activated charcoal in liquid air, to make a vacuum photocell.

A relay tube 39 and a condenser 41 are housed in the neck or extension 38 of the envelope 11, as illustrated most clearly in Figure 3. The relay tube 39 is desirably formed as described and claimed in the Rentschler Patent No. 2,079,362 of May 4, 1937, and owned by the assignee of the present application, except that it is not necessary to base it. That is, the tube comprises an envelope 42 of glass or the like and three electrodes supported from the stem 43 thereof, the electrode 44 desirably formed of thorium and functioning as a cathode, electrode 45 as the main anode, and electrode 46 as the starting or auxiliary anode.

Although all of these electrodes are supported from the stem or press 43, as by means of support wires 47, 48 and 49, the starting anode 46 has its outside connection desirably made by means of lead-in conductor 51 extending through the end portion of the tube or envelope 42 opposite to that to which the stem or press 43 is secured. Before sealing the relay tube 39 and the condenser 41 in the extension 38, both are desirably coated with insulating material 52 such as the sealing wax shown, in order to prevent surface leakage. As alternatives the envelope 42 of the relay tube may be painted with a light-absorbing coating 53, or formed of red or green glass, which is sufficiently light absorbing, as the thorium cathode is not photosensitive to wave lengths much longer than 3650 A. U., while the other parts from which the leads extend, are coated with sealing wax.

The condenser and relay tube do not have to be coated with sealing wax if the leakage during calibration is negligible, as moisture due to sealing-in can be removed in the exhaust.

Figure 4:
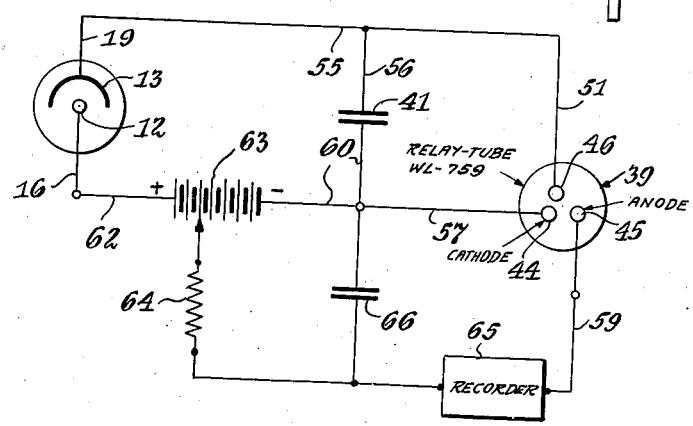
Figure 4 is a diagram of the circuit employed in measuring radiations by means of the tube illustrated in the preceding figures.

The connections between the electrodes 12 and 13 in the photoelectric tube compartment proper and the leads to the relay tube and condenser in the extension or auxiliary tube 38, are as shown in Figures 1 and 3, and in accordance with the diagram in Figure 4.

The cathode 13 is connected by means of lead-in conductor 19, coil spring 54 and lead 55 to the lead 56, which connects one pole of the condenser 41 to the lead-in conductor 51 from the starting anode 46. The other pole of the condenser is connected by means of lead 57 to cathode 44, and a lead 60 from said connection extends through flare or press 58 of extension 38, out of the envelope 11, forming one of the terminals of the combination photoelectric tube. Another terminal of the tube connects with the main anode 45 of the relay tube 39 by means of lead 59 extending through the same press 58, while the third terminal connects with the anode 12 of the photoelectric tube proper by means of supporting portion 14, lead 16, coil spring 61, and lead 62 through the same press 58.

It will thus be seen that the anode 12 of the radiation-responsive device disclosed is, when assembled for use, as diagrammatically shown in Figure 4, connected through leads 16 and 62 to the positive terminal of a source of potential, for example, a battery of cells 63. The negative terminal of said source of potential is connected by means of lead 60 to one side of condenser 41, while the other side is connected to the cathode 13 by means of leads 56, 55 and 19, as well as to the starting anode 46 of the relay tube by means of leads 56 and 51. The cathode 44 of the glow relay tube 39 is also connected to said negative pole of the battery 63, by means of conductors 57 and 60, thereby completing the input circuit to said relay tube 39 in accordance with the Rentschler Patent No. 2,037,925, previously referred to.

The output circuit of the system shown in Figure 4 comprises a fixed or variable resistance 64 of appropriate value, having one end thereof connected to the positive terminal of one of the cells in the battery 63, and the other end of which is connected to one terminal of a recording device 65 and one pole of a condenser 66. The other pole of the condenser 66 is connected to the lead 60, as shown most clearly in Figure 4. The other terminal of the recording device 65 is connected to the anode 45 of the relay tube 39 as by means of lead-in conductor 59.

From the foregoing disclosure, it will be seen that all of the parts of the input circuit, shown in the diagram of Figure 4, are enclosed in the extended evacuated envelope 11 and thereby kept moisture-free and protected from leakage, except the energizing battery 63. The operation of the device for the measuring of radiations is as described and claimed in the Rentschler Patent No. 2,037,925, previously referred to, except that, by virtue of enclosing the parts of the input circuit for protection against leakage due to moisture, the accuracy of the measurement is greatly increased.

It will be seen that the main difference in the photoelectric portion of the combined device, is that the lead 19 from the cathode 13 goes through the stem or lower part of the enlarged or bulbous portion of the envelope 11, rather than through the upper portion. In order, however, to test the photoelectric portion of the combined tube, separately from the associated condenser 41 and relay tube 39, after the parts are assembled as a unit, we desirably also provide a lead 67 extending through the upper portion of the envelope 11 and having a coil spring 68 housed in a tubular extension 69. That portion of the lead 67 between the seal 71 and the cross wire 23 is desirably a coil of soft wire 72 to prevent strain in the seal 71 and allow the lead 67 to be properly positioned for sealing-in at 71. The spring 68 desirably carries an eyelet 73 at its outer end, so that it may be grasped and pulled out of the enclosing tube 59 for connection with a testing circuit. After testing the photoelectric portion, the spring 68 may be allowed to contract to the position illustrated, and the tube 69 sealed at 74 and covered by a protective housing 75.

In manufacturing a combined meter device such as heretofore disclosed, the photoelectric tube portion is exhausted, the anode sputtered to provide the sensitive cathode surface, and the envelope re-exhausted as previously described. The tube is then tested for the spectral position of the energy cutoff, after which it may be exposed to the radiations from a suitable source, with the lead 19 connected to the top of the relay tube 39 in the regular meter circuit, and the lead 16 connected to the positive side of the battery. Arrangements should be made so that the condenser 41, between the top of the relay tube 39 and the negative side of the battery 63, can be changed at will until one is found of such capacity that energy unit indicating clicks of the recorder 65 come at the desired intervals.

When a condenser having the proper capacity is found, it and the relay tube are mounted on the flare 58, as shown in Figure 3. A spring is welded to each of the leads 16 and 19 coming from the photoelectric portion, in such a manner that their ends can be pulled past the end of the extended neck 38. The relay tube and condenser, mounted on the flare 58, are pushed up into the neck 38, but the flare held far enough out so that the springs 54 and 61 can be pulled down and welded to the leads 55 and 62.

Positions in making the foregoing assembly are illustrated in Figures 5 to 8, inclusive. Figure 5 shows the envelope 11 and the flare 20 carrying the photoelectric assembly on its way up the neck 38 toward the enlarged portion of said envelope 11.

Figure 6:
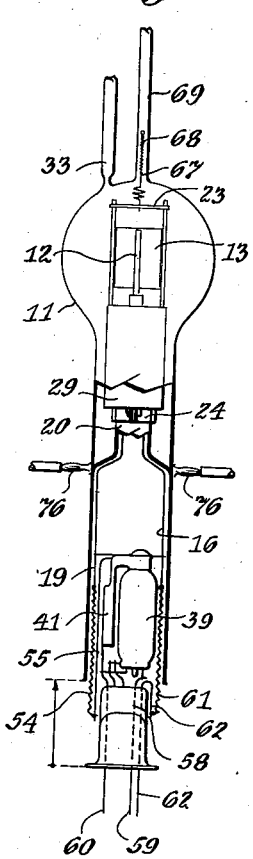
Figure 6 illustrates the position of the parts at a subsequent stage in the assembly.
Figure 8:
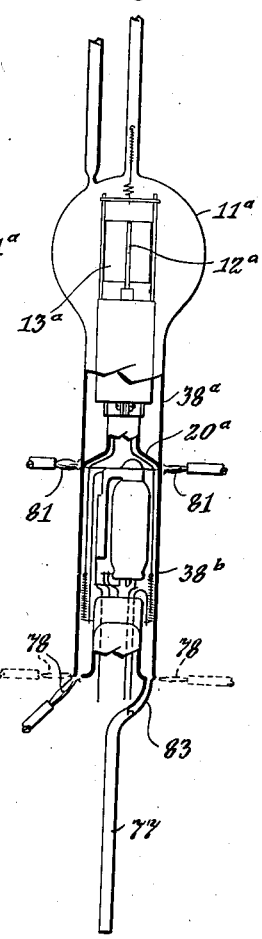
Figure 8 is a view illustrating a position of the parts when a tube, as in Figures 1, 2 and 3, is about to be sealed, when constructed in accordance with modification of Figure 7.

Figure 6 shows the flare 20 and the supported photoelectric anode 12 and cathode 13 in place in the envelope 11, and fires 76 being employed to fuse the flare 20 to the extension 38 at the proper place along its length. The springs 54 and 61 are, in this figure, shown pulled down and welded to the leads 55 and 62. After this has been accomplished, the flare 58 is inserted into the neck 38, and its peripheral flange sealed to the outer end thereof, using the sealing fires 78, as shown in Figure 8. The extension containing the relay tube and condenser is then exhausted, using the tube 77 and tipped off while on the pump.

Figure 7:
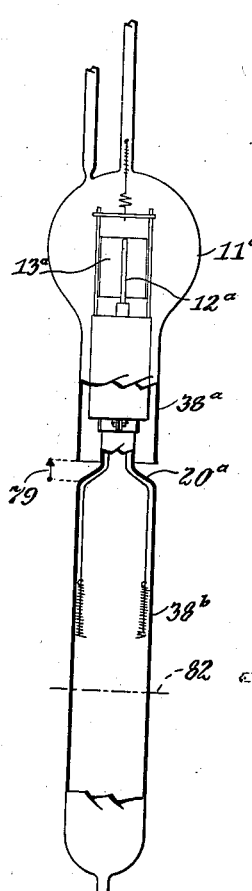
Figure 7 is a view illustrating the position of the parts at an early stage in the assembly of a tube, like that of Figures 1, 2 and 3, but in which said parts are slightly modified as compared with the showing in Figures 5 and 6.

Figure 7 shows an alternative form in which the neck 38ª of the envelope 11ª is relatively short, and the extension portion 38ᵇ carries the flare 20ª and the supported photo-electric interior assembly comprising the anode 12ª and the cathode 13ª. The tube extension 38ᵇ is moved, as indicated by the arrow 79, and sealed to the lower edge of the tube 38ª by the fires 81, as illustrated in Figure 8. The lower portion of the extension 38ᵇ may be cut off as indicated by the dotted line 82, and the subsequent formation of the device may then be in accordance with Figures 6 and 8, as described in connection with the other embodiment.

After sealing, as shown in Figure 8, the neck 38 is well exhausted, warmed slightly with a torch, being careful not to get too close to where the neck is sealed on to the bulb of the envelope 11, and after thorough exhausting, said neck portion is tipped off as at 83.

Figure 9:
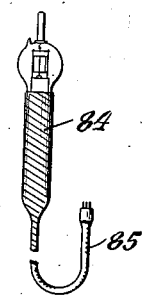
Figure 9 is a view of a tube such as shown in Figures 1, 2 and 3, with the stem taped and provided with an extension cord for transmitting energizing current to the same.

After the device is completely assembled and tested, the tubular extension 38, or 38ª—38ᵇ, as the case may be, is desirably covered by protective tape 84, as shown in Figure 9, and provided with an extension cord 85.

From the foregoing, it will be seen that by virtue of the compartment 38, containing the relay tube and condenser, being hermetically sealed from the main or bulbous compartment of the envelope 11, the degrees of exhaust in the two compartments do not need to correspond. It is, therefore, feasible to make a vacuum type photo-electric tube or one of the gaseous type, as desired, without regard to the degree of vacuum in the neck compartment 38.

Although preferred embodiments of our invention have been disclosed, it will be understood that modifications may be made within the spirit and scope of the appended claims, and that the envelope 11 may be generally cylindrical or have a shape other than that illustrated, if desired.

We claim:

1. A photoelectric device comprising an envelope consisting of a tubular portion and another portion, a cathode disposed in said other portion and sensitive to radiations to be measured, said other portion being permeable to such radiations, an anode mounted in cooperative relationship with said cathode, and a relay tube and condenser in said tubular portion.

2. A photoelectric device comprising an envelope consisting of a tubular portion and an enlarged bulbous portion, a cathode disposed in said enlarged portion and sensitive to radiations to be measured, said enlarged portion being permeable to such radiations, an anode mounted in cooperative relationship with said cathode, and a relay tube and condenser in said tubular portion.

3. A photoelectric device comprising an envelope consisting of a tubular portion and another portion, a tantalum sensitized cathode disposed in said other portion, an anode mounted in cooperative relationship with said cathode, said other portion being permeable to substantially all bactericidal radiations below 3000 Angstrom units, and a relay tube and condenser in said tubular portion.

4. A photoelectric device comprising an envelope consisting of a tubular portion and an enlarged bulbous portion, a tantalum sensitized cathode disposed in said enlarged portion, an anode mounted in cooperative relationship with said cathode, said enlarged portion being permeable to substantially all bactericidal radiations below 3000 Angstrom units, and a relay tube and condenser in said tubular portion.

5. A photoelectric device comprising an envelope having two compartments hermetically sealed from each other, a titanium sensitized cathode disposed in one compartment, an anode mounted in cooperative relationship with said cathode, said compartment being permeable to substantially all radiations between 2700 and 3100 Angstrom units, and a relay tube and condenser mounted in said other compartment.

6. A photoelectric device comprising an envelope consisting of an exhausted tubular portion, and an enlarged bulbous portion, a cathode disposed in said enlarged portion and sensitive to radiations to be measured, an anode mounted in cooperative relationship with said cathode, said enlarged portion being permeable to radiations to be measured, a partition hermetically sealing said enlarged portion from said tubular portion and a relay tube and condenser in said tubular portion.

7. A photoelectric device comprising a cathode sensitive to substantially all radiations below 3000 Angstrom units, an anode, an envelope enclosing said electrodes with at least the portion opposite the sensitive surface of said cathode permeable to radiations below 3000 Angstrom units, and a relay tube and condenser also sealed in said envelope, but separated from said electrodes by a partition.

8. A photoelectric device comprising a cathode sensitive to substantially all radiations between 2700 and 3100 Angstrom units, an anode, an envelope enclosing said electrodes with at least the portion opposite the sensitive surface of said cathode permeable to radiations below 3200 Angstrom units, and a relay tube and condenser also sealed in said envelope, but separated from said electrodes by a partition.

9. A photoelectric device comprising an elongated envelope, a cathode disposed in one end portion and sensitive to radiations to be measured, an anode mounted in cooperative relationship with said cathode, said end portion being permeable to radiations to be measured, a flare tube separating the portion of said tube containing said cathode and anode from the remainder and supporting said electrodes, and a relay tube and condenser in the other portion of said envelope.

10. A photoelectric device comprising an envelope having a main portion and an elongated neck portion, a light-sensitive cathode disposed in said main portion, an anode mounted in cooperative relationship with said cathode, both of said elements being supported from a flare tube the peripheral portion of which is hermetically sealed to said neck portion in order to divide said envelope into said main and elongated portions, and an associated condenser and relay tube mounted on a flare tube hermetically sealing the outer end of said neck portion, said neck portion being exhausted to keep said condenser and relay tube free from moisture.

11. A photoelectric device comprising an envelope consisting of a main portion with an elongated neck extending therefrom, photoelectric elements mounted on a flare tube and supported in the main portion of said envelope, said flare tube serving to hermetically seal the outer portion of said neck therefrom, leads extending through a press on said flare tube and terminating in springs, a condenser and relay tube mounted on another flare tube and electrically connected to said photoelectric elements by said springs, in order to allow for connection outside of said neck and subsequent insertion therein, said condenser and relay tube flare tube serving to hermetically seal the outer end of said neck.

12. A photoelectric device, comprising a cathode sensitive to radiations to be measured, an anode mounted in cooperative relationship with said cathode, a relay tube and a condenser, and a single evacuated envelope enclosing all of said elements.

13. A photoelectric device, including as elements, a cathode and an anode of photoelectric means connected to a relay tube and condenser, and a common evacuated envelope enclosing all of said elements, said condenser being connected across the starting anode and the cathode of said relay tube, and the pole of said condenser which is connected to said starting anode, being also connected to said photoelectric cathode.

14. A photoelectric device comprising an envelope consisting of a main bulb portion with an elongated neck extending therefrom, photoelectric elements mounted on a flare tube, hermetically sealed to said neck portion, and extending into said bulb portion, a rare gaseous atmosphere in said bulb portion, leads extending through said flare tube and terminating in springs, and a condenser and relay tube mounted on another flare tube and electrically connected to said springs in order to allow for connection outside of said neck and subsequent insertion therein, said other flare tube serving to hermetically seal the outer end of said neck, and the latter being evacuated between said flare tubes, in order to keep the condenser and relay tube free from moisture.

15. A photoelectric device comprising a single envelope hermetically divided into two compartments by a flare tube, a cathode sensitive to radiations to be measured and a cooperating anode sealed in one of said compartments, a relay tube and a condenser sealed in said other compartment, electrical connections between said cathode and anode and said relay tube and condenser, terminals to said anode, condenser and relay tube extending out of said other compartments, and a second conductor for testing purposes extending from said cathode out of the first-mentioned compartment.

16. A photoelectric device, comprising a cathode sensitive to radiations to be measured and a cooperating anode mounted in one compartment of an envelope, and a connected relay tube and condenser mounted in another compartment, said compartments being hermetically sealed from one another and the atmosphere and exhausted to different degrees of vacuum.

HARVEY C. RENTSCHLER.
DONALD E. HENRY.